United States Patent
Rao

(10) Patent No.: US 7,050,191 B2
(45) Date of Patent: May 23, 2006

(54) SUB-BANDING OF DISPLAY LIST AND VIDEO BUFFER FOR PAGE RENDERING IN A DIGITAL SIGNAL PROCESSOR

(75) Inventor: Pochiraju Srinivas Rao, Karnataka (IN)

(73) Assignee: Texas Instruments Incorporated, Dallas, TX (US)

(*) Notice: Subject to any disclaimer, the term of this patent is extended or adjusted under 35 U.S.C. 154(b) by 985 days.

(21) Appl. No.: 09/990,841

(22) Filed: Nov. 9, 2001

(65) Prior Publication Data

US 2002/0054309 A1 May 9, 2002

Related U.S. Application Data

(60) Provisional application No. 60/247,654, filed on Nov. 9, 2000.

(51) Int. Cl.
*G06F 15/00* (2006.01)
*G06K 1/00* (2006.01)
*G06K 15/00* (2006.01)

(52) U.S. Cl. .................. 358/1.16; 358/1.15; 358/1.16; 358/1.17; 358/1.9; 358/523

(58) Field of Classification Search .............. 358/1.16, 358/1.15, 1.9, 1.17, 523
See application file for complete search history.

(56) References Cited

U.S. PATENT DOCUMENTS 5,410,672 A * 4/1995 Sodek et al. ............... 710/52
5,604,846 A * 2/1997 Kadota ..................... 358/1.16
6,115,131 A 9/2000 Payne
6,538,764 B1 * 3/2003 Ueda ........................ 358/1.16

FOREIGN PATENT DOCUMENTS

EP 0 801 357 A 10/1997
WO WO 96 39680 A 12/1996

* cited by examiner

Primary Examiner—Joseph R. Poxrzywn
Assistant Examiner—Yixing Qin
(74) Attorney, Agent, or Firm—Robert D. Marshall, Jr.; W. James Brady, III; Frederick J. Telecky, Jr.

(57) ABSTRACT

A print method converts page description data specifying a print document into pixel data. The print system includes a central processing unit, a first memory and a second memory that is smaller but faster than the first memory. The method extracts a display list from the page description data (503), allocates space within the first memory to serve as a page buffer and divides the page buffer within the first memory into a plurality of sub-bands. Each sub-band is smaller than the second memory. For each sub-band the method renders pixels of a current sub-band into the second memory (506). When the sub-band is completely rendered, the method transfers pixel data from the second memory to the current sub-band of the page buffer (509). When all sub-bands are rendered, the page is printed by transfer of data from the page buffer to a print engine (512). The central processing unit and the second memory are preferably disposed on the same integrated circuit.

6 Claims, 4 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO SRAM
(5) L2 VICTIM WRITE BACK, OR DMA OUT OF SRAM
(6) DMA INTO SRAM
(7) DMA OUT OF SRAM

US 7,050,191 B2

SUB-BANDING OF DISPLAY LIST AND VIDEO BUFFER FOR PAGE RENDERING IN A DIGITAL SIGNAL PROCESSOR

CLAIM OF DOMESTIC PRIORITY

This application claims priority from U.S. Provisional Patent Application No. 60/247,654 filed Nov. 9, 2000.

TECHNICAL FIELD OF THE INVENTION

The technical field of this invention is printer controllers which receive data in a page description language.

BACKGROUND OF THE INVENTION

Rendering is part of the process of printing a page received in a page description language. During rendering the objects of the display list corresponding to the page are converted into individual picture elements or pixels. These pixels specify the page to be printed. The density of the rendered pixels is set by the capabilities of the print engine. This rendering is inherently a high memory bandwidth process.

Laser printers or ink jet printers capable of printing from page description language data typically employ a print controller. The print controller takes the task of receiving print data inputs, converting this into pixels that can be printed by the print engine and controlling the print engine. The memory bandwidth required in this process, particularly in rendering, can be very large. For example, at 600 dots per inch (dpi) an 8-bit color page may require 128 Mbytes for storage as individual pixels. The print controller may be a high-speed Reduced Instruction Set Computer (RISC) microprocessor, one or more Application Specific Integrated Circuits (ASIC) and memory.

The print controller is typically the bottleneck in the print system. The print engine is not able to run continuously at its rated sped. Instead, the print engine prints a page, then pauses for the data processing to complete the next page before printing again. Thus such a system may not be able to operate at the page per minute of the print engine because the print controller throttles the system.

This problem is aggravated by the trend toward increasing page densities. Page density is the ratio of the portion of a printed page receiving print to the printable area of the whole page. In the 1980's pages were typically text and had print densities in the range of 5%. Printed pages today typically have print densities in the range of 30 to 40%. Those knowledgeable in the print business expect typical print densities to reach 80%. The higher the print density the greater the task of rendering the display list into page pixels.

The problem of printing from page description language data is mostly a problem of memory bandwidth. The process of rendering the pixels requires movement of lots of data. Thus use of a faster processor or greater compute resources in ASICs would not help the problem significantly.

SUMMARY OF THE INVENTION

Many digital signal processors of the type capable of serving as print controllers include some high speed static random access memory (SRAM) on the same integrated circuit as the central processing unit. This SRAM typically operates at a speed equal to or comparable to the central processing unit. This combination provides a high bandwidth between the SRAM and the central processing unit.

This invention employs this on-chip SRAM as a page buffer. For a standard A4 page rendered at 600 dpi, the video buffer may require on the order of 32 Mbytes per color plane. On the other hand, on-chip SRAM for digital signal processors is typically tens to hundreds of Kilobytes. This is a problem in using the on-chip SRAM as video buffer.

This invention divides the page buffer into slices or sub-bands. Each such sub-band should be small enough to fit within the on-chip SRAM. The corresponding display list is also divided into corresponding sub-bands.

The rendering process then takes place in the on-chip SRAM. This employs the high bandwidth connection with the central processing unit. The much slower external access of the digital signal processor is used only for loading the display list sub-band and for outputting the rendered sub-band.

BRIEF DESCRIPTION OF THE DRAWINGS

These and other aspects of this invention are illustrated in the drawings, in which.

DETAILED DESCRIPTION OF PREFERRED EMBODIMENTS

Printer controllers for computer systems have steadily grown in sophistication and performance. Digital signal processors are increasingly used to perform the wide variety of tasks required which include a high level of signal processing capability and multi-faceted interface requirements. Memory control is centralized in a memory interface controller function. These systems use increasingly large memory functions of several types, such as synchronous dynamic random access memory (SDRAM) and flash memory.

Figure 1:
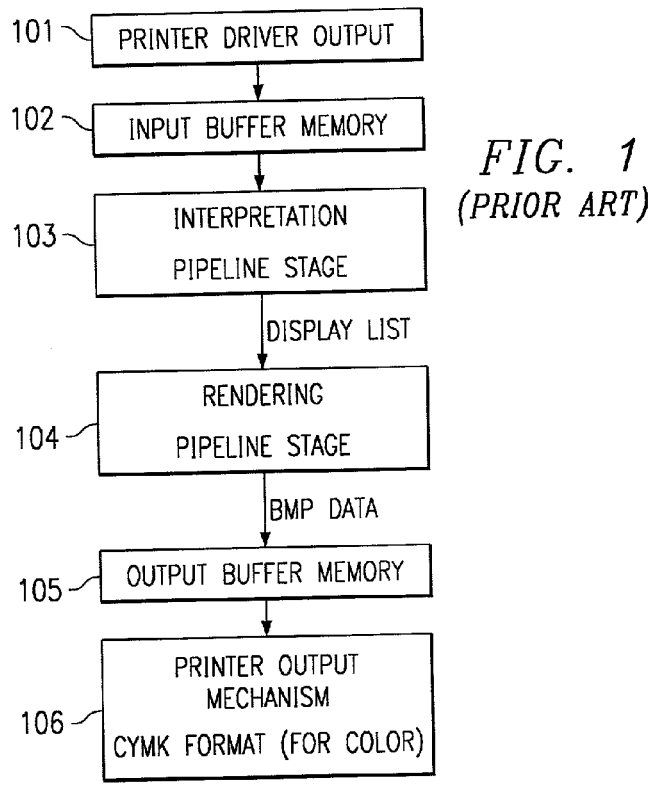
FIG. 1 illustrates a prior art printer controller pipeline.

FIG. 1 illustrates the prior art steps required to process the input data that a printer typically receives from a conventional personal computer (PC). The output from the PC normally is supplied by a printer driver 101 that prepares an output print file. This file includes a set of instructions and data in a page description language (PDL) or compressed bitmap format. These instructions and data may be transported to the printer via IEEE 1284 (Firewire) or Universal Serial Bus (USB) cabling or over a local area network and stored in an input buffer memory 102.

The first computational step in the printer controller pipeline is interpretation 103 of the data. The display list from interpretation 103 includes a description of individual elements of graphics data or text data along with the position of these elements on the page. The display list may be in a banded or a non-banded format. In a banded format discrete bands are defined and formed as a part of the processing. After rendering, a number of these bands collectively form a full printer controller output page. In a non-banded format, each page is interpreted as a unit. After rendering, this unit forms an integral part of printer controller output.

The rendering pipeline stage 104 reduces the interpreted data of the display list to printer specific raster data. This process is sometimes called rasterization. The output of the rendering process is a bit map format in which discrete digitized dots (pixels) are generated to control the output device (e.g. ink jet pen, laser drum) with proportions of the colors cyan, yellow, magenta, and black. The rendering step is well suited to digital processing operations commonly used in digital signal processor devices. After rendering, the bit map data is stored in an output buffer memory stage 105. This bit map data is sent as needed to the printer output mechanism 106.

Figure 2:
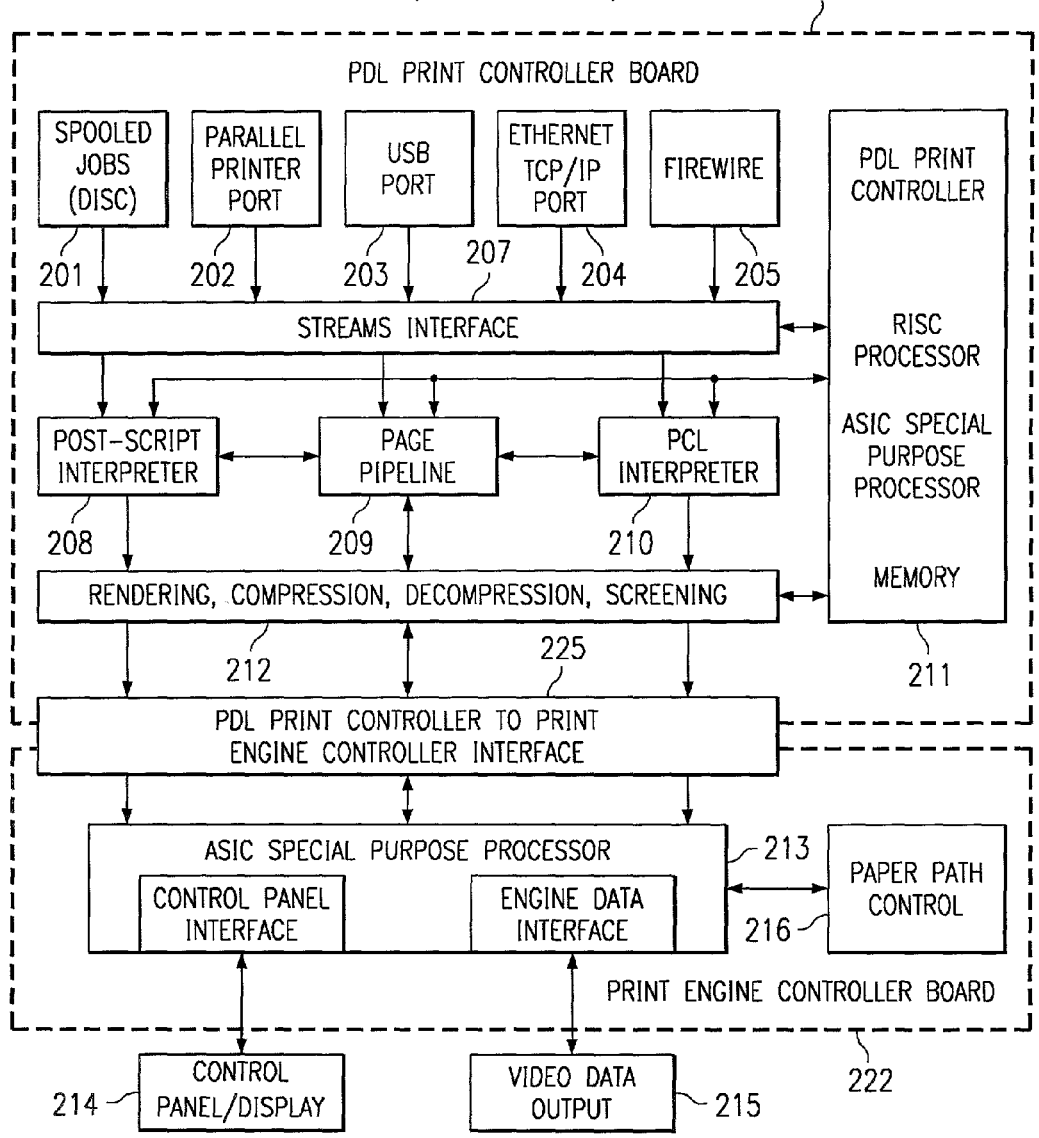
FIG. 2 illustrates a prior art printer system with a page description language (PDL) printer controller board interfaced with a separate engine controller board.

FIG. 2 illustrates a high-level view of the full complement of printer pipeline functions of the prior art. The input data has a variety of sources, such as spooled jobs on disc 201, parallel printer port 202, Universal Serial Bus (USB) port 203, Ethernet TCP/IP port 204 and IEEE 1284 (Firewire) 205. Each data source has its specific data format. This data must be reduced to a common format for processing in the pipeline. Streams interface unit 207 adjusts the format of the input data as required. For example, data arrives in parallel form from parallel printer port 202 and is converted in streams interface unit 207 as necessary for uniform processing in later stages. Likewise, streams interface unit 207 often carries out format adjustments upon data from USB port 203 in queue coming from the host processor.

Streams interface unit 207 sends data to the path that performs parallel interpretation of the composite postscript 208, printer control language PCL 210 or other PDL interpreter 210. Page pipeline block 209 re-assembles the results of the interpretation process into page format for page oriented processing before submitting page data to rendering unit 212. Streams interface 207, postscript interpreter 209, page pipeline block 209, PCL interpreter 210 an rendering unit 210 are controlled by PDL print controller 211. Postscript interpreter 208 or PCL interpreter 210 may send banded format data directly to rendering unit 212. Rendering unit 212 also performs compression, decompression or screening as required. PDL print controller to print engine controller interface unit 225 supplies data and control information to ASIC special purpose processor 213 to drive paper path control 216, the control panel/display 214 and the video data output 215.

Figure 3:
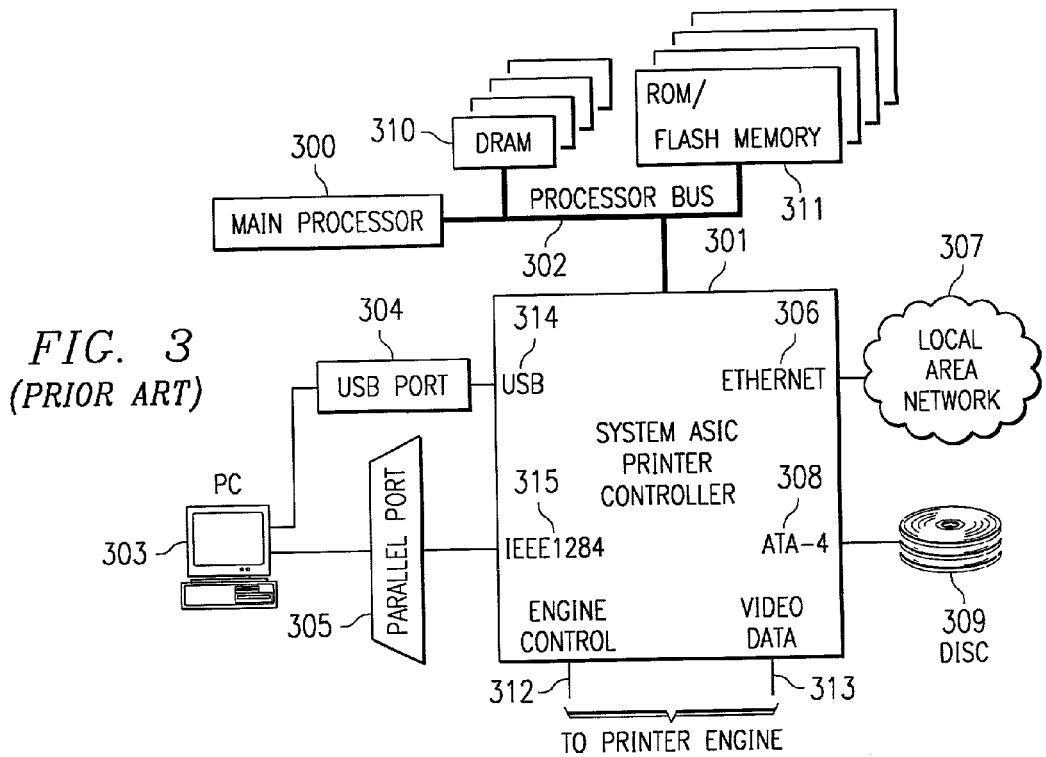
FIG. 3 illustrates a prior art single memory printer controller.

FIG. 3 illustrates a conventional printer controller system. The system has typically a main processor 300 and a system ASIC printer controller 301, both served by a single processor bus 302. All major compute functions are carried out within the main processor 300.

The system interfacing to a personal computer (PC) 303 is directed by the system ASIC printer controller 301 via a USB port 304 or alternately by an IEEE 1284 (Firewire) compatible parallel port 305. ASIC printer controller 301 directs networking by the system via the Ethernet 306 from a local area network 307 and provides a mass storage interface via an ATA-4 compatible disc interface 308 to disc drive 309.

System data movement among main processor 300, system ASIC print controller 301, synchronous dynamic random access memory (SDRAM) 310 and read only memory (ROM) or FLASH memory 311 are all accomplished via processor bus 302. System ASIC print controller 301 provides interface to printer engine via engine control signals 312 and video data output 313.

Figure 4:
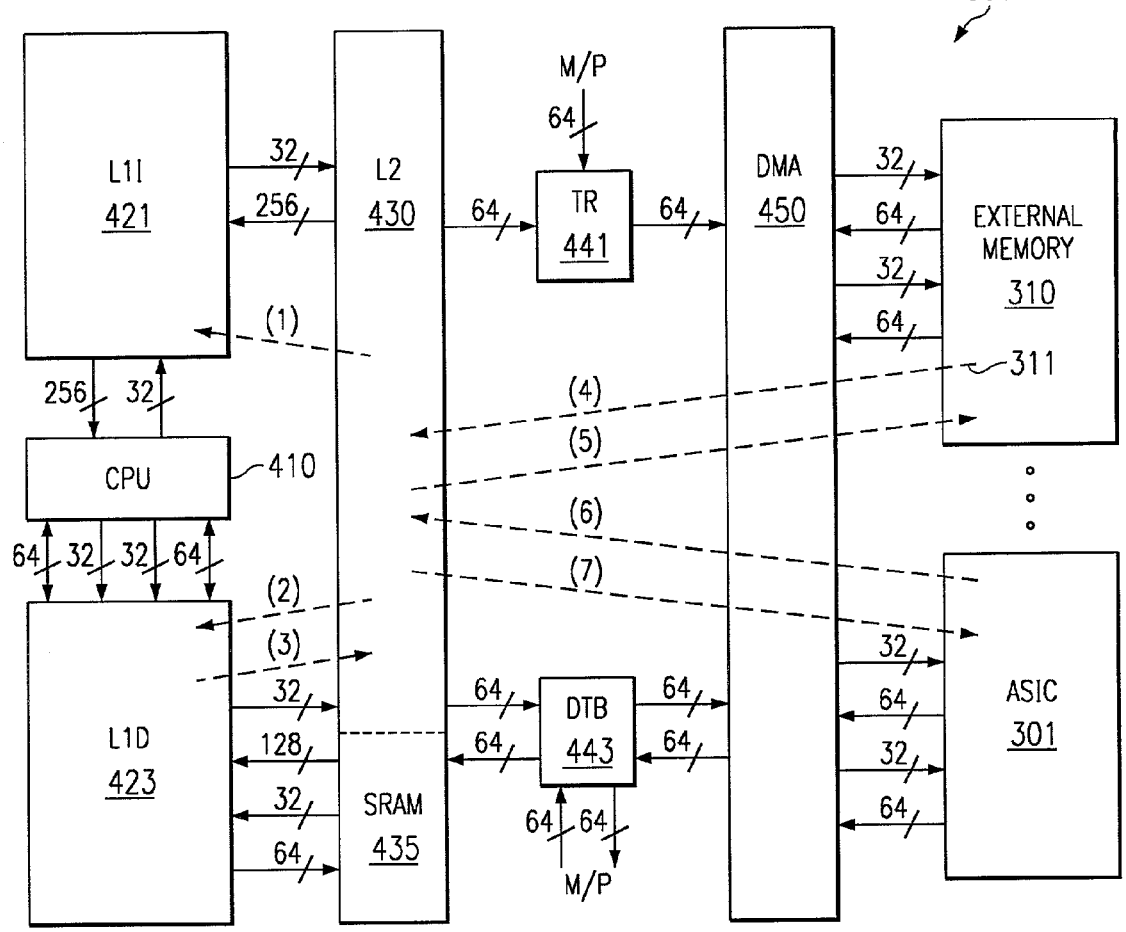
FIG. 4 illustrates an example of a data processor core, which may include cache and local memory, a direct memory access unit and an external memory interface.

FIG. 4 illustrates the organization of a digital signal processor system 300 to which this invention is applicable. This description corresponds to a TMS320C6211 digital signal processor sold by Texas Instruments. Other digital signal processors or general purpose processors may be used to embody this invention. In order to be useful in this invention the processor must have a high bandwidth access to memory. This will be further explained below.

Digital signal processor system 300 includes central processing unit core 410. Central processing unit core 410 includes the data processing portion of digital signal processor system 300. Central processing unit core 410 could be constructed as known in the art and would typically includes a register file, an integer arithmetic logic unit, an integer multiplier and program flow control units.

Digital signal processor system 300 includes a number of cache memories. FIG. 4 illustrates a pair of first level caches. Level one instruction cache (L1I) 421 stores instructions used by central processing unit core 410. Central processing unit core 410 first attempts to access any instruction from level one instruction cache 421. Level one data cache (L1D) 423 stores data used by central processing unit core 410. Central processing unit core 410 first attempts to access any required data from level one data cache 423. The two level one caches are backed by a level two unified cache (L2) 430. In the event of a cache miss to level one instruction cache 421 or to level one data cache 423, the requested instruction or data is sought from level two unified cache 430. If the requested instruction or data is stored in level two unified cache 430, then it is supplied to the requesting level one cache for supply to central processing unit core 410. As is known in the art, the requested instruction or data may be simultaneously supplied to both the requesting cache and central processing unit core 410 to speed use.

Level two unified cache 430 is further coupled to higher level memory systems. Digital signal processor system 300 may be a part of a multiprocessor system. The other processors of the multiprocessor system are coupled to level two unified cache 430 via a transfer request bus 441 and a data transfer bus 443. A direct memory access unit 450 provides the connection of digital signal processor system 300 to external memory including SDRAM 310 and ROM/FLASH memory 311 and the system ASIC print controller 301.

The exemplary TMS320C6211 allows a single memory to be selectively partitioned into unified level two cache 430 and directly accessible static random access memory 435. The proportions of the cache and SRAM provided may vary form all cache to all SRAM. This is illustrated by the dashed line dividing unified level two cache 430 and directly addressable SRAM 435. When configured to include a non-zero amount of SRAM, SRAM 435 is accessible as normal read/write memory which operates under program control. This memory space may be either a source or a destination of a direct memory access. In accordance with this invention, digital signal processor 300 must be configured with at least some SRAM. Note that a memory selectively partitionable between cache and SRAM is not required for this invention. This invention merely requires the existence of some on-chip SRAM, which may be separate form any cache.

The complex interrelation of parts of digital signal processor system 300 permits numerous data movements. These are illustrated schematically in FIG. 4 and will be listed here. First, level one instruction cache 421 may receive instructions recalled from level two unified cache 430 (1) for a cache miss fill. In this example, there is no hardware support for self-modifying code so that instructions stored in level one instruction cache 421 are not altered. These are two possible data movements between level one data cache 423 and level two unified cache 430. The first of these data movements is a cache miss fill from level two unified cache 430 to level one data cache 423 (2). Data may also pass from level one data cache 423 to level two unified cache 430 (3). This data movement takes place upon; a write miss to level one data cache 423 which must be serviced by level two unified cache 430; a victim eviction from level one data cache 423 to level two unified cache 430; and a snoop response from level one data cache 423 to level two unified cache 430. Data can be moved between level two unified cache 430 of SRAM 435 and external memory 310/311. This can take place upon: a cache miss to level two unified cache 430 service from external memory (4) or a direct memory access 450 data movement from external memory 310/311 to SRAM 435; a victim eviction from level two unified cache 430 to external memory 461 (5) or a direct memory access 450 data movement from SRAM 435 to external memory 310. Finally, data can move between level two unified cache 430 and system ASIC 301. These movements take place upon: or a direct memory access 450 data movement from ASIC 310 to SRAM 435; or a direct memory access 450 data movement from SRAM 435 to ASIC 301. All data movement between level two unified cache 430/SRAM 435 and external memory 310/311 and between level two unified cache 430/SRAM 435 and ASIC 301 employ data transfer bus 443 and are controlled by direct memory access unit 450. These direct memory access data movements may take place as result of a command from central processing unit core 410 or a command from another digital signal processor system received via transfer request bus 441.

Figure 5:
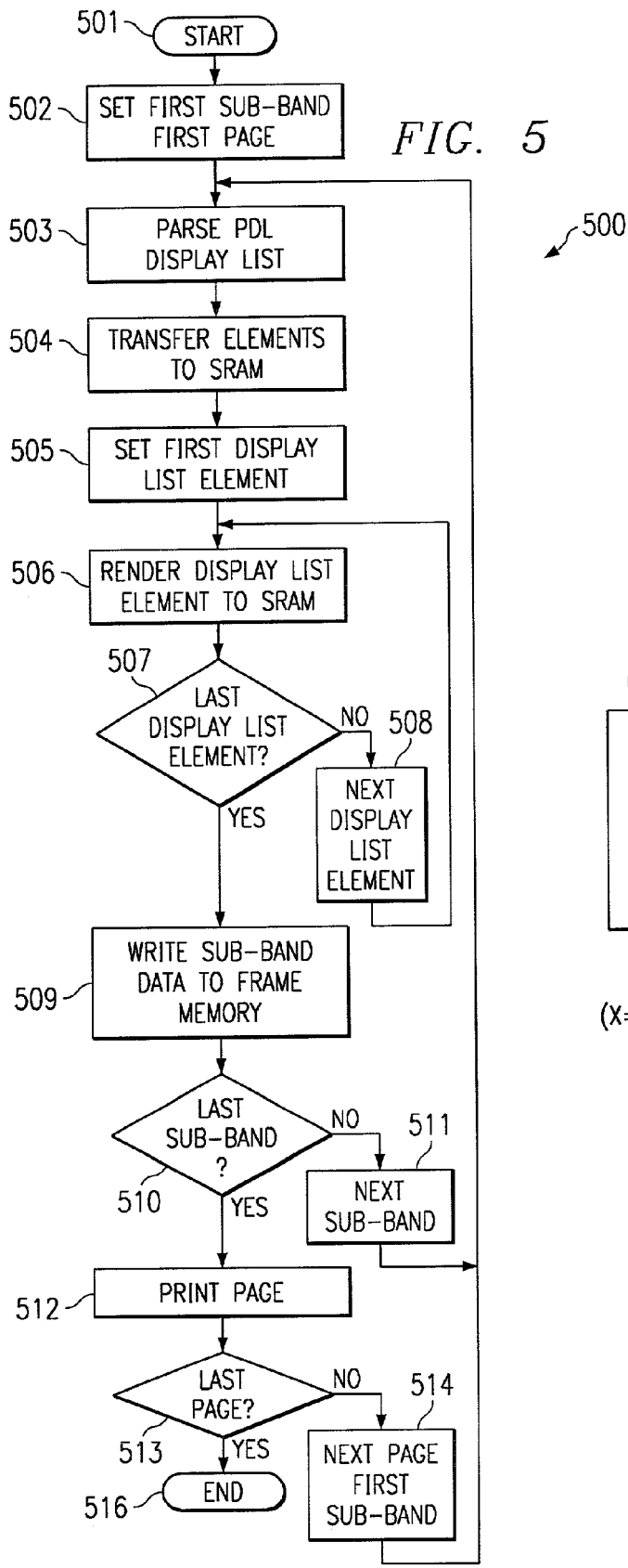
FIG. 5 is a flow chart describing the method of this invention.

FIG. 5 illustrates process 500 of this invention in flow chart form. Process 500 is the manner that digital signal processor 300 performs part of rendering pipeline stage 104 illustrated in FIG. 1. There are several preliminary matters required before process 500 can take place. The programmer must allocate memory space within SDRAM 310 to store the rendered page. It is typical to render the page completely into a page buffer before beginning the print engine. This assures that the print engine will not stall for lack of data and spoil a page. In laser printers the print engine operates at a single speed and the print data must be available when the photoconductive drum is at the corresponding page location. Depending on the relative print and rendering speeds, it may be possible to race the print engine. This involves starting the print engine before the entire page is rendered with the expectation that the print data for the lower portions of the page will be available at the time needed. In some systems with limited memory, the print data is compressed following rendering. By storing only the compressed bands, less memory is required. The print data is decompressed as needed by the print engine during printing or partially decompressed. These techniques are related memory management solutions to the present invention, but not part of the invention.

Following allocation of memory to the page buffer, the page buffer must be divided into sub-bands. Digital signal processor 300 will render each sub-band individually. The sub-band size must be selected to be less than the size of the on-chip SRAM. It is helpful to align the sub-band boundaries with page buffer memory words. This will be more fully described below.

Process 500 begins with start block 501. Process 500 first sets the current page as the first page and the current sub-band as the first sub-band of the current page description language file to be printed (processing block 502). Process 500 parses the display list of the page description language file for the current page to determine which display list elements will render to the current sub-band (processing block 503). Detailed rendering is not required. It is better to falsely determine that a display list element will write to the sub-band than to improperly omit a display list element from this parsed list. Process 500 then transfers the parsed list of display elements for the current page and sub-band to SHAM 435 (processing block 504). Additional auxiliary data required to render these display element may also be transferred to the on-chip SHAM. This auxiliary data could be fonts, color tables and the like. These steps (processing blocks 502 and 503) store in data needed for rendering in SRAM 435. This serves to increase the rendering speed because of the high memory bandwidth between central processing unit 410 and SHAM 435. These steps are not necessary to obtain substantial benefit from this invention. Since the display list elements and the auxiliary data probably is less than the rendered sub-band data, the benefit of processing blocks 502 and 503 will not be as great as the benefit from the rendered data.

Process 500 next sets the current display element to the first display element of the parsed list (processing block 505). Process 500 then renders the current display element into the sub-band region of SRAM 435 (processing block 506). This will involve a final determination that the display list element does actually render to the current sub-band. This also involves truncating the rendered data to the current sub-band. This portion of the process is memory bandwidth intensive. Using on-chip SRAM 435 as the target memory insures the maximum available processor/memory bandwidth.

Process 500 then checks to determine if the current display element is the last display element (decision block 507). If this is not the last display element (No at decision block 507), then process 500 sets the next display element as the current display element (processing block 508). Processing block 500 then returns to processing block 506 to render the new display element into the sub-band memory space of SRAM 435.

Figure 6:
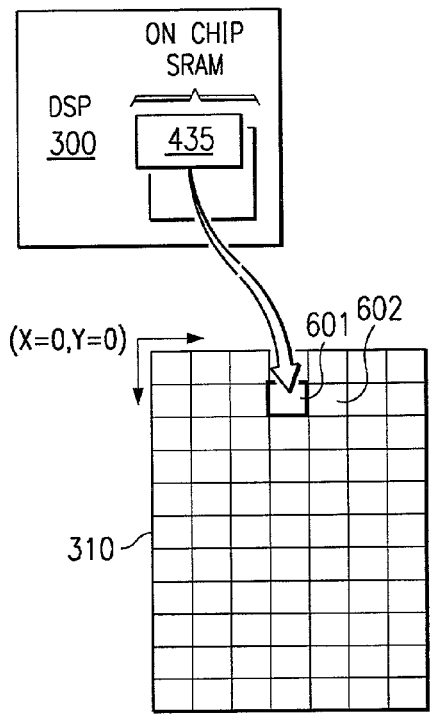
FIG. 6 illustrates schematically the data transfer between the on-chip SRAM and the page memory.

If the current display element is the last display element for the current sub-band (Yes at decision block 507), then the current sub-band is completely rendered. Process 500 transfers the rendered page data from the on-chip SRAM to the page buffer memory. This process is illustrated schematically in FIG. 6. Rendered page data from SRAM 435, a part of digital signal processor 300, is written into the corresponding sub-band 601 within SDRAM 310. The page buffer holds the completely rendered page before transmission to the print engine for printing. Process 500 then tests to determine if the current sub-band is the last sub-band (decision block 510). If this is not the case (No at decision block 510), then process 500 sets the next sub-band as the current sub-band (processing block 511) and then returns to processing block 503. This begins the rendering process for the new sub-band. FIG. 6 illustrates the next sub-band 602 for process 500.

If the current sub-band was the last sub-band for the current page (Yes at decision block 510), then process 500 prints the current page (processing block 512). Process 500 prints the page in the same manner as the prior art by transferring the print data to the print engine and controlling the paper movement and printing process. As discussed above, this print process may include print data compression and decompression to save memory space within SDRAM 310.

Process 500 then tests to determine if the current page is the last page of the page description language file (decision block 513). If the current page is not the last page of this document (No at decision block 513), the process 500 sets the next page as the current page and the first sub-band as the current sub-band (processing block 514). Process 500 then returns to processing block 503, beginning the process for rendering and printing the new page. If the current page is the last page (Yes at decision block 513), then the document printing is complete. Process 500 ends with end block 516.

This sub-band process is advantageous due to the nature of rendering. Rendering will often take place at positions other than word boundaries within the memory system. The display list of the page description language can specify the print color of any dot on the page. Thus many of the writes to memory will not be aligned with memory data words. These non-aligned writes are typically performed and read-modify-write cycles. The whole memory word is read into central processing unit 410. The memory word is modified by writing the pixel data in the corresponding location without changing other parts of the memory data word. Then the whole memory data word is written to the main memory. This changes a single write into a combination read and write operation. Such non-aligned writes may take place often and depend on the relationship between the length of a memory data word and the length of a pixel data word. The rendering may require several read-modify-write cycles to the same memory data word. This could occur if differing display list elements specify pixel data for differing pixels within the same memory word. Differing display list elements often specify differing pixel data for the same pixel. This could occur if one object overlays another. In such a case, a paint analogy is often used with the last specified object controlling the pixel data for that particular pixel.

These factors mean that often a particular memory word within the page buffer must be written to and read from many times during the rendering process. In accordance with this invention, such multiple accesses take place into SRAM 435 which has a high memory bandwidth connection to central processing unit 410. The transfer of rendered data from SRAM 435 to the corresponding sub-band 601 within SDRAM 310 may take place in a burst fashion. This data transfer can be made mostly in whole memory data words. The only possible areas requiring read-modify-write cycles are at the sub-band edges. If the sub-bands are aligned with memory data words, even the edges can be transferred in whole memory data words. The memory transfer rate between SRAM 435 and the page buffer within SDRAM 310 is so much slower than the memory transfer rate between central processing unit 410 and SRAM 435, that buffering or caching the rendering in SRAM 435 will generally be advantageous.

What is claimed is:

1. A method of converting page description data specifying a print document into pixel data for an individual page employing a data processing system including a central processing unit, a first memory having a first data size and a first data transfer rate and a second memory having a second data size smaller than the first data size and a second data transfer rate faster than the first data transfer rate, the method comprising the steps of:

extracting a display list from the page description data;

allocating space within the first memory to serve as a page buffer;

dividing the page buffer within the first memory into a plurality of sub-bands, each sub-band having a data size smaller than the second data size;

for each sub-band within the page buffer
  for each element of the display list rendering pixels within the current sub-band into a corresponding memory location within the second memory,
  following the rendering step, transferring pixel data from the second memory to corresponding memory locations within the current sub-band of the page buffer;

following the rendering and transferring steps for all sub-bands, printing a page by transfer of data from the page buffer to a print engine.

2. The method of claim 1, further comprising the step of:
disposing the central processing unit and the second memory on the same integrated circuit.

3. The method of claim 1, further comprising the step of:
prior to the rendering step for each sub-band within the page buffer, copying display list elements that may render to the current sub-band to the second memory, and
wherein the rendering step employs the copy of display list elements stored in the second memory.

4. The method of claim 3, further comprising the step of:
prior to the rendering step for each sub-band within the page buffer, copying auxiliary data required by the display list elements that may render to the current sub-band to the second memory, and
wherein the rendering step employs the copy of auxiliary data stored in the second memory.

5. The method of claim 1, wherein the digital processing system includes a partitionable memory selectively partitionable between cache and directly addressable memory, the method further comprising the step of:
prior to the rendering step for a first sub-band partitioning the partitionable memory to include directly addressable memory to serve as the second memory.

6. The method of claim 1, further comprising the step of:
following transferring pixel data from the second memory to corresponding memory locations within the current sub-band of the page buffer, compressing the pixel data and storing the compressed pixel data in the first memory; and
the printing step includes recall and decompression of the compressed pixel data.

* * * * *